(12) United States Patent
Nielsen et al.

(10) Patent No.: US 7,779,435 B2
(45) Date of Patent: Aug. 17, 2010

(54) METHODS AND APPARATUS TO EXPORT TUNING DATA COLLECTED IN A RECEIVING DEVICE

(75) Inventors: Christen V. Nielsen, Palm Harbor, FL (US); Mark Richard Cave, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 695 days.

(21) Appl. No.: 11/552,824

(22) Filed: Oct. 25, 2006

(65) Prior Publication Data

US 2007/0083882 A1 Apr. 12, 2007

Related U.S. Application Data

(63) Continuation of application No. PCT/US2004/012929, filed on Apr. 26, 2004.

(51) Int. Cl.
*H04H 60/32* (2008.01)

(52) U.S. Cl. ............... 725/14; 725/9; 725/12; 725/15; 725/16; 725/19; 725/21; 725/133; 725/141; 725/153; 348/734; 348/725; 348/570; 348/722; 341/173; 341/174; 341/175; 341/176; 341/177; 341/178; 341/179; 341/180; 341/181; 341/182; 341/183; 341/184

(58) Field of Classification Search .......... 725/9, 725/12, 14–16, 19, 21, 133, 141, 153; 348/734, 348/725, 570, 722; 341/173–184
See application file for complete search history.

(56) References Cited

U.S. PATENT DOCUMENTS

| | | | |
|---|---|---|---|
| 3,936,752 A * | 2/1976 | Sasabe et al. ............ 455/181.1 |
| 4,546,382 A | 10/1985 | McKenna et al. | |
| 4,658,290 A | 4/1987 | McKenna et al. | |
| 4,816,904 A | 3/1989 | McKenna et al. | |
| 4,905,080 A | 2/1990 | Watanabe et al. | |
| 5,208,462 A * | 5/1993 | O'Connor et al. ........ 250/493.1 |
| 5,291,325 A * | 3/1994 | Elliott .................... 398/106 |
| 5,305,464 A | 4/1994 | Frett | |
| 5,402,251 A * | 3/1995 | Ogasawara et al. ......... 358/473 |
| 5,483,276 A | 1/1996 | Brooks et al. | |
| 5,561,543 A * | 10/1996 | Ogawa .................... 398/107 |

(Continued)

FOREIGN PATENT DOCUMENTS

WO 0022824 4/2000

(Continued)

OTHER PUBLICATIONS

International Preliminary Report on Patentability corresponding to International Application No. PCT/US2004/012929, mailed Nov. 9, 2006, 7 pages.

(Continued)

*Primary Examiner*—Jason P Salce
(74) *Attorney, Agent, or Firm*—Hanley, Flight, & Zimmerman, LLC

(57) ABSTRACT

Methods and apparatus to export tuning data collected in a receiving device are disclosed. An example method of collecting audience measurement data comprises collecting tuning data within a receiving device, and modulating an LED associated with the receiving device to export the collected tuning data from the receiving device.

24 Claims, 8 Drawing Sheets

U.S. PATENT DOCUMENTS

| | | | |
|---|---|---|---|
| 5,603,078 A | 2/1997 | Henderson et al. | |
| 5,677,895 A * | 10/1997 | Mankovitz | 368/10 |
| 6,005,490 A * | 12/1999 | Higashihara | 340/825.72 |
| 6,216,266 B1 * | 4/2001 | Eastman et al. | 725/72 |
| 6,223,348 B1 * | 4/2001 | Hayes et al. | 725/152 |
| 6,407,779 B1 * | 6/2002 | Herz | 348/734 |
| 6,448,550 B1 * | 9/2002 | Nishimura | 250/226 |
| 6,484,316 B1 | 11/2002 | Lindberg | |
| 6,526,581 B1 | 2/2003 | Edson | |
| 6,549,719 B2 * | 4/2003 | Mankovitz | 386/83 |
| 6,567,978 B1 | 5/2003 | Jarrell | |
| 6,668,132 B2 * | 12/2003 | Wissman | 386/46 |
| 6,778,225 B2 * | 8/2004 | David | 348/734 |

FOREIGN PATENT DOCUMENTS

| | | |
|---|---|---|
| WO | 0038360 | 6/2000 |
| WO | 2005032144 | 4/2005 |
| WO | 2005038625 | 4/2005 |
| WO | 2005079941 | 9/2005 |
| WO | 2005107110 | 11/2005 |
| WO | 2006014344 | 2/2006 |
| WO | 2006020560 | 2/2006 |
| WO | 2006037014 | 4/2006 |
| WO | 2005032146 | 11/2006 |
| WO | 2005115011 | 11/2006 |

OTHER PUBLICATIONS

Lee et al., Methods and Apparatus for Using Audience Member Behavior Information to Determine Compliance With Audience Measurement System Usage Requirements, U.S. Appl. No. 60/662,604, filed Mar. 17, 2005.

Written Opinion of the International Searching Authority corresponding to International application No. PCT/US2004/012929, mailed Feb. 18, 2005, 7 pages.

International Search Report corresponding to International application No. PCT/US2004/012929, mailed Feb. 18, 2005, 3 pages.

* cited by examiner

METHODS AND APPARATUS TO EXPORT TUNING DATA COLLECTED IN A RECEIVING DEVICE

RELATED APPLICATIONS

This patent arises from a continuation of international patent application serial number PCT/US2004/012929, which was filed on Apr. 26, 2004 and which is hereby incorporated by reference in its entirety.

FIELD OF THE DISCLOSURE

This disclosure relates generally to audience measurement, and, more particularly, to methods and apparatus to export tuning data collected in a receiving device.

BACKGROUND

As used herein, "broadcast" refers to any sort of electronic transmission of signals from a source to multiple receiving devices. Thus, a "broadcast" may be a cable broadcast, a satellite broadcast, a terrestrial broadcast, a traditional free television broadcast, a radio broadcast, and/or an internet broadcast, and a "broadcaster" may be any entity that transmits signals for reception by a plurality of receiving devices. The signals may include content, (also referred to herein as "programs"), and/or commercials (also referred to herein as "advertisements"). An "advertiser" is any entity that provides an advertisement for inclusion in a broadcast signal.

Companies that rely on broadcast video and/or audio programs for revenue, such as advertisers, television networks and content providers, wish to know the size and demographic composition of the audience(s) that consume program(s). Audience measurement companies typically address this need by measuring the demographic composition of a set of statistically selected households and the program consumption habits of the member(s) of those households. For example, audience measurement companies may collect viewing data on a selected household by monitoring the content displayed on that household's television(s) and by identifying which household member(s) are present in the room when that content is displayed.

Gathering this audience measurement data has become more difficult as the diversity of broadcast systems has increased. For example, while it was once the case that television broadcasts were almost entirely radio frequency, terrestrial based, broadcast systems (i.e., traditional free television), in recent years cable and satellite broadcast systems have become commonplace. Further, these cable and/or satellite based broadcast systems often require the use of a dedicated receiving device such as a set top box or an integrated receiver decoder to tune, decode, and display broadcast programs. To complicate matters further, these receiving devices for alternative broadcast systems as well as other receiving devices such as local media playback devices (e.g., video cassette recorders, digital video recorders, and personal video recorders) have made time shifted viewing of broadcast and other programs possible.

For example, prior to the advent of these devices, televisions were used solely for real-time viewing of tuned broadcast programs. As such, an audience measurement company could monitor all of the television viewing for a given television set by monitoring the channel to which the television tuner was tuned. However, when a receiving device is employed, it has a tuner of its own. Therefore, the tuned channel of the television may not be indicative of the program being viewed by the audience. For instance, a television tuned to a particular channel (e.g., 3 or 4) may not be displaying a program it has tuned, but may instead be displaying a program tuned by an external receiving device on a completely different channel, a recorded program played from a tape, a digital versatile disk (DVD) or hard disk drive, or a program played from another source. Thus, the presence of receiving devices such as set top boxes, integrated receiver decoders, VCRs, digital video recorder, etc. complicates the audience monitoring process.

Because of the possible discrepancy between the channel tuned by the television and the program actually presented on the television, it has been proposed to use software meters within receiving devices such as set top boxes. A software meter is a program (i.e., a collection of machine readable instructions such as software or firmware) that, when executed, cause a processor or other logic device to collect and store tuning data. Such software meters have been employed in receiving devices that are particularly constructed to host the same. However, not all receiving devices have been constructed to host such a software meter. Thus, while some receiving devices have the processing capability to host a software meter and the memory resources to store tuning data collected by such a software meter, because such devices where not constructed with the intent of hosting a software meter, many such receiving devices have no output port intended to output such tuning data.

DETAILED DESCRIPTION

Figure 1:
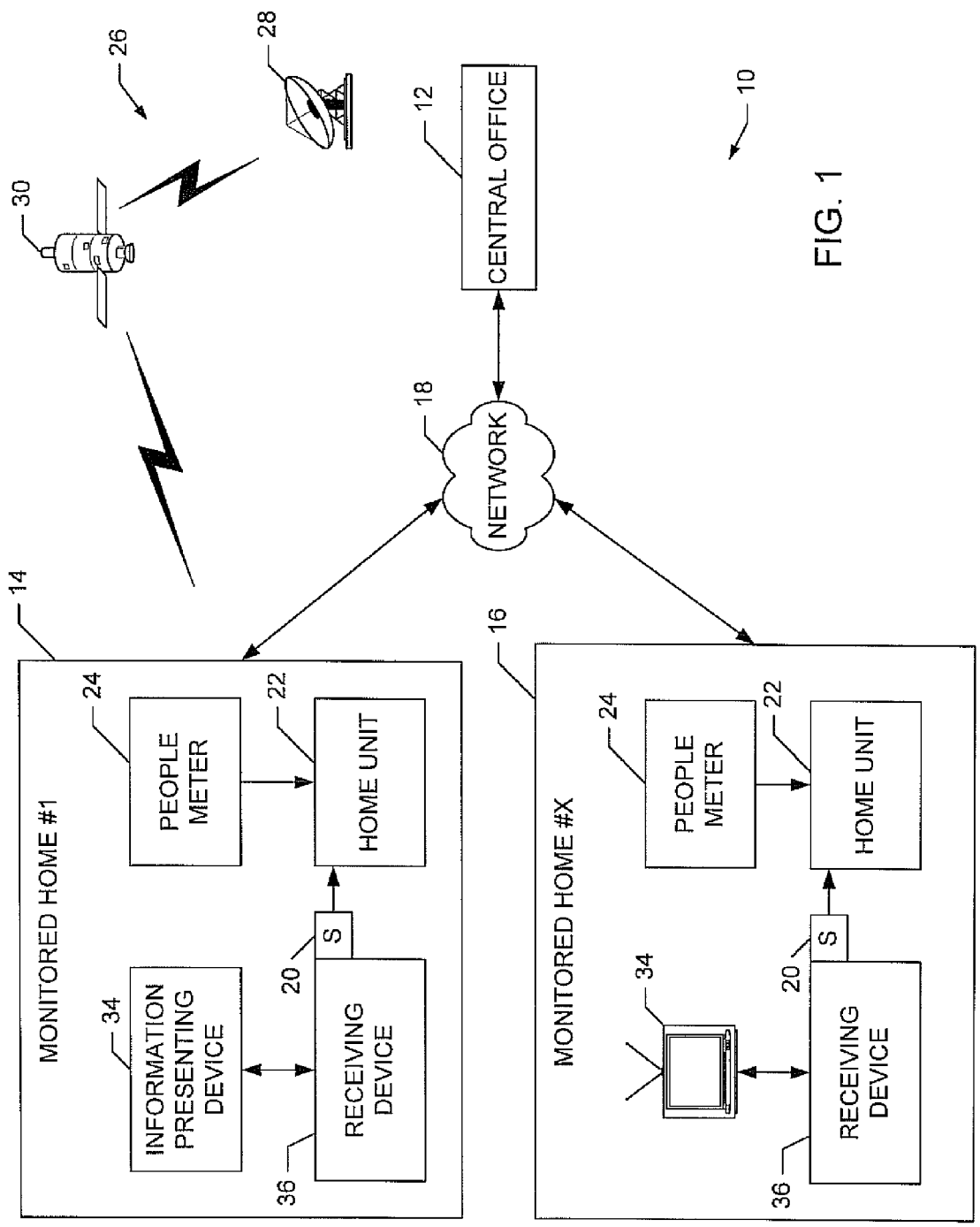
FIG. 1 is a schematic illustration of an example audience measurement system shown in the context of monitoring broadcasts by an example satellite broadcast system.

FIG. 1 is a schematic illustration of an example system 10 to develop audience measurement statistics. In the illustrated example, a central data collection office 12 is connected to a plurality of statistically selected households 14, 16 via a network 18. The monitored home sites 14, 16 are provided with one or more sensing module(s) 20, home unit(s) 22, and people meter(s) 24 to gather data identifying the broadcast programs consumed by the members of the monitored households 14, 16 and the household members that consumed those programs.

The people meter 24 of the illustrated example is a conventional, well known device used to collect audience identification data. Thus, the people meter 24 may be an active device, a passive device, or a combination active/passive device. For example, the people meter 24 may be structured to periodically (e.g., after expiration of a predetermined time period) or a-periodically (e.g., in response to one or more predetermined events such as a channel change, a change in the number of persons detected to be in the audience, etc.) prompt the audience members to identify themselves as present in the room. Those audience members that respond to such a prompt are logged as present in the audience. The people meter 24 may accomplish this prompting of the audience in various fashions. For example, the people meter 24 may include a visual or audible transducer (e.g., a flashing light or a speaker) to provide a signal to the audience requesting the audience members to enter their identities into the people meter 24. Alternatively, the people meter 24 may be a passive device which seeks to obtain the identities of the audience members without requiring the active participation of the audience members. An example passive people meter 24 seeks to identify audience members by comparing digital photographs or other images of the audience against stored images of known audience members. Of course, other known methods of prompting or identifying the audience members may alternatively be employed.

The people meter 24 may accept data from the audience members in any known way. For example, the people meter 24 may include pushbutton switches wherein each button is assigned to a predetermined member of the household, such that depressing a button is an indication that a corresponding household member is in the audience. Alternatively or additionally, the people meter 24 may accept data via a remote control device.

The people meter 24 may be a stationary or portable device. In the portable example, the people meter 24 preferably includes a plurality of meters 24; each of which is structured to be worn by an audience member. Such portable meters 24 may be used within the household 14, 16 as well as outside of the household. Irrespective of whether portable people meters, stationary people meters, or a combination of portable and stationary people meters are employed in a given household 14, 16, multiple people meters 24 may be employed in a single home site 14, 16. As discussed below, although its primary function is to collect audience identification information, the people meter 24 may also be adapted to store and forward tuning data. This tuning data collection functionality is particularly useful in the out of home context.

The illustrated home unit 22 is also a well known, conventional device. Thus, the illustrated home unit 22 receives and stores tuning data collected by one or more data collection engines (which may possibly also be people meters 24) located in the household 14, 16 and receives and stores audience identification data collected by one or more people meters 24 associated with the household 14, 16. Although persons of ordinary skill in the art will appreciate that multiple data collection engines of various known designs may be present in some or all of the households 14, 16, the following description will focus on a software meter based data collection engine. In the illustrated examples, one or more software meters are resident in one or more of the receiving devices 36 of the household 14, 16 to collect tuning data, and the sensing module 20 is used to receive and decode the tuning data output by the software meter. Thus, the home unit 22 receives tuning data from the sensing module 20. Example software meters and sensing modules 20 are discussed in further detail below.

The data collected in the monitored home sites 14, 16 (e.g., the tuning data and the audience identification data) is exported periodically, a periodically, or continuously from the home units 22 to the central office 12 via the network 18. The data collection office 12 includes one or more computers that analyze the tuning and audience identification data received from the monitored home sites 14, 16 to develop meaningful audience measurement statistics such as, for example, television ratings, audience share measurements, etc. The network 18 can be implemented by any desired network such as, for example, the Internet, the public switched telephone network, a wireless connection, dedicated connections, etc.

In the illustrated example, the home sites 14, 16 receive video and/or audio programs broadcast from one or more broadcasting systems 26. Although FIG. 1 schematically illustrates the broadcasting systems 26 by a single satellite broadcast system 26 including a satellite up-link 28 and a satellite 30, persons of ordinary skill in the art will readily appreciate that more than one broadcast system of the same or different types may be employed. For example, the broadcasting systems may be implemented by one or more of a terrestrial broadcasting system, a cable broadcasting system, a satellite broadcasting system, the Internet, or any other broadcasting system. Thus, the broadcast systems 26 may be operated by any type of video and/or audio service provider such as a cable television service provider, a satellite television or radio service provider, an internet content provider that provides, for example, streaming video content, and/or a radio frequency (RF) television service provider. The service providers may broadcast analog and/or digital video signals over a wired connection such as a coaxial cable or over a wireless connection such as a satellite and/or a terrestrial broadcast system.

The broadcast programs may include primary content (e.g., entertainment, informational and/or educational content such as movies, television network programs, sporting events, news, etc.) and may also include secondary content (e.g., commercials) interspersed within the primary content.

The home sites 14, 16 may include any number of information presenting devices 34 such as a digital or analog television, a computer, a terrestrial or satellite radio, a stereo, an Internet appliance, etc. In the illustrated example, the home sites 14, 16 also include one or more receiving devices 36 such as a set top box, an integrated receiver decoder, a digital video recorder, a personal video recorder, a computer, a video cassette recorder (VCR), etc. In the following examples, a software meter is resident in a receiving device 36 to collect and store tuning data.

Figure 2:
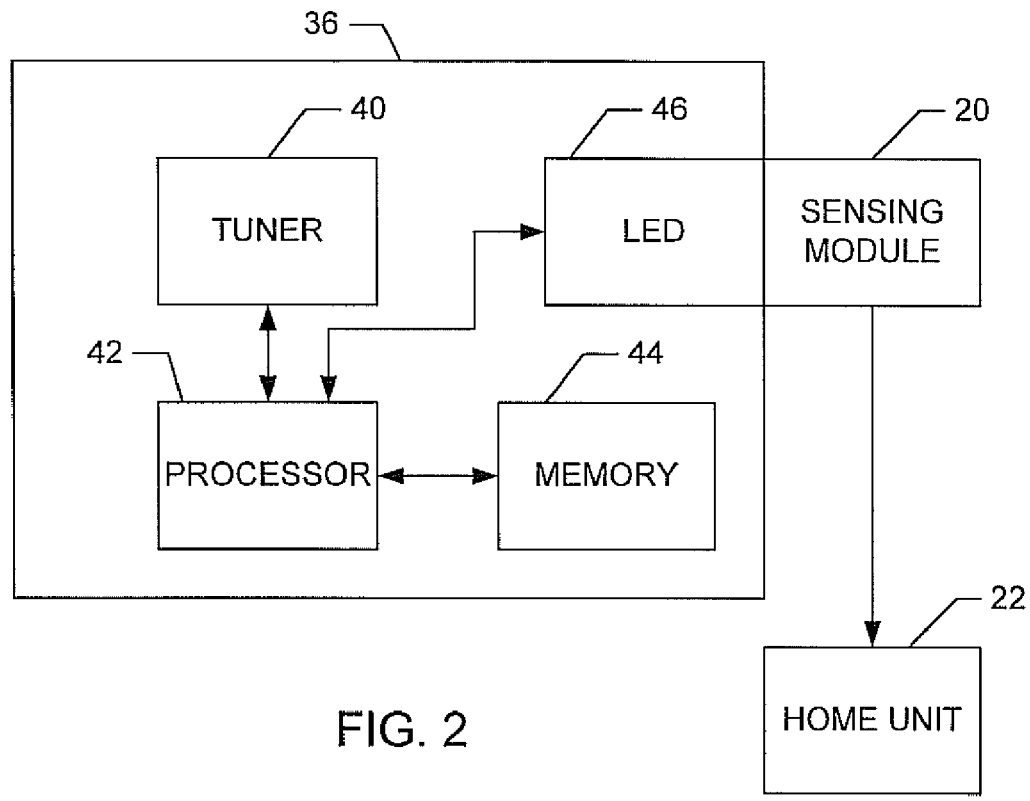
FIG. 2 is a schematic illustration of an example receiving device and sensing module which may be employed in the system of FIG. 1.

An example receiving device 36 is shown in further detail in FIG. 2. In the illustrated example, the receiving device 36 includes a tuner 40 to tune a program carried on a broadcast channel. The tuner 40 may be adapted to tune analog and/or digital program signals. In the digital context, the tuner 40 may be adapted to tune a minor channel carried within a tuned major channel. Thus, the tuner 40 may output audio, video and data streams associated with a channel or program identified by a user of the receiving device by extracting those a/v/d streams from a multiplexed datastream. The tuner 40 is a conventional, well known device that, in the interest of brevity, will not be further described here.

The tuner 40 of the illustrated example is controlled by a processor 42. The processor 42 may be any commercially available processor such as a microprocessor sold by Intel, AMD, Texas Instruments, etc. As is conventional, the processor 42 is coupled to one or more memories 44. The memory 44 may be any type of volatile or non-volatile memory or a combination thereof. For example, the memory 44 may include one or more of: dynamic random access memory, static random access memory, flash memory, a hard drive, etc. Typically, a portion of the memory 44 will store machine readable instructions which may be executed by the processor 42 to perform one or more functions. For instance, in the illustrated example, the memory 44 stores a software meter which causes the processor 42 to collect and store tuning data. The data collected by the software meter executing on the processor 42 is stored in the memory 44 within the receiving device.

As will be appreciated by persons of ordinary skill in the art, with the exception of the inclusion of a software meter, the foregoing description of a receiving device 36 is generic to most types of receiving devices. For example, it may be representative of a set top box, an integrated receiver decoder, a digital video recorder, or another well known device. As will be further appreciated by persons of ordinary skill in the art, most such receiving devices 36 are not intended for use with a software meter and, thus, are not provided with a data port for exporting tuning data collected and stored within the receiving device by such a software meter. The following examples disclose methods and apparatus to export such tuning data from a receiving device 36 lacking such an available output port for tuning data exportation.

In the example illustrated in FIG. 2, the receiving device 36 is provided with one or more light emitting diodes (LEDs) 46. These LEDs 46 are provided in the receiving device for a purpose other than data transmission. For example, the receiving device 36 may include an LED 46 that functions as a power status indicator (i.e., the LED is lit to a generally constant "on-state" whenever the receiving device 36 is in an on-state and the LED is darkened whenever the receiving device 36 is turned off). As another example, the receiving device 36 may be provided with an LED display (i.e., an ordered array of LED segments) which may be selectively lit and darkened to display characters (e.g., a channel number or call letters of a channel tuned by the receiving device 36, a mode of the receiving device, or another factory or consumer programmed message). In the illustrated example, the receiving device 36 is structured to take advantage of the presence of this LED or LEDs 46 to export the tuning data.

Figure 3:
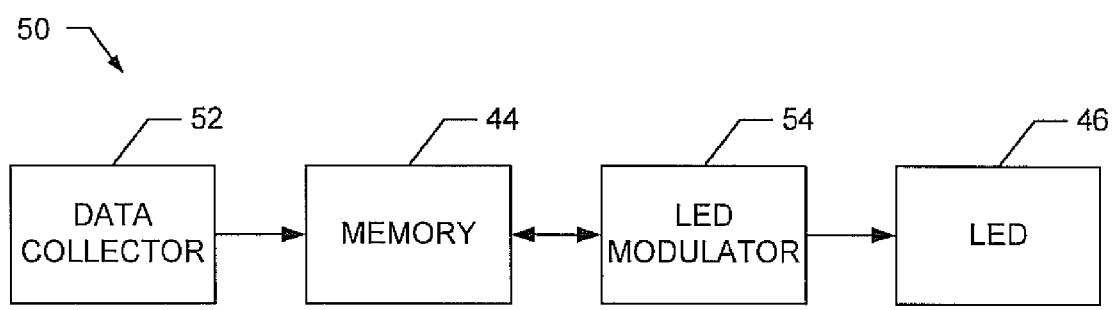
FIG. 3 is a schematic illustration of an apparatus which may be included in the example receiving device of FIG. 1 to collect tuning data and export the collected tuning data by modulating an LED of the receiving device.

An example apparatus 50 that may be implemented within the receiving device 36 to collect and export tuning data is shown in FIG. 3. In the illustrated example, the apparatus 50 is provided with a data collector 52 to collect tuning data within the receiving device 36. The data collector 52 may collect any type of tuning data of interest. For example, the tuning data collected by the data collector 52 may include any of: (a) a channel identifier of a tuned channel, (b) status data associated with the receiving device 36, (c) a local source identifier (e.g., satellite tuner, cable tuner, antennae, etc.), (d) a menu indicator, (e) a program guide indicator, (f) power status (e.g., power on or off), (g) an input signal condition indicator (e.g., good quality signal, bad quality signal, etc.), (h) a program identification code broadcast with the program, (i) a station identification code broadcast with the program, (j) a watermark embedded in the program, (k) a program signature (e.g., a proxy representative of a characteristic of a signal associated with the program) representative of the program, and (l) video-on-demand (VOD) information (e.g., VOD state identifier (e.g., an indication of whether video-on-demand functionality is active or inactive), VOD ordering information, VOD payment information, VOD program identification, time of VOD order information, time of VOD delivery information, etc.). Additionally or alternatively, the tuning data may include: (a) a DVR state identifier (e.g., an indication of whether the digital video recording functionality is active or inactive), (b) a playback time (e.g., the current time), (c) a broadcast time (e.g., the time at which the program currently being viewed was originally broadcast), (d) a playback mode (e.g., play, play suggestion (i.e., automatic recording by a personal video recorder based on a consumer profile), pause, stop, fast forward, fast reverse, slow forward, slow reverse, bypass, etc.), (e) a source channel identifier (i.e., the channel number or station call letters of the channel tuned when the program currently being displayed was recorded), and/or (f) a program name. The data collector 52 stores the collected tuning data in the memory 44 for later exportation.

To export the collected tuning data, the apparatus 50 is further provided with an LED modulator 54. The LED modulator 54 modulates one or more of the LEDs 46 (e.g., the power state indicator, one segment of an LED display, or a plurality of segments of the LED display) of the receiving device 36 to export the tuning data collected by the data collector 52. The LED modulator 54 may operate to output the tuned data continuously (subject to system resource availability), periodically (e.g., every few minutes, every few seconds, etc.), or a-periodically (e.g., whenever a predetermined event occurs such as whenever a predetermined amount of the memory 44 is filled, etc.). The LED modulator 54 may modulate one or more of the LEDs 46 between an on-state and an off-state in predefined patterns representative of predefined characters (e.g., a framing bit, a "1" and a "0") representative of the tuning data collected by the data collector 52. Preferably, the LED modulator 54 modulates the LED(s) 46 at a data rate above the sensitivity of the human eye such that the "flickering" of the LED or LED segment(s) 46 is not noticeable to a human.

Figure 4:
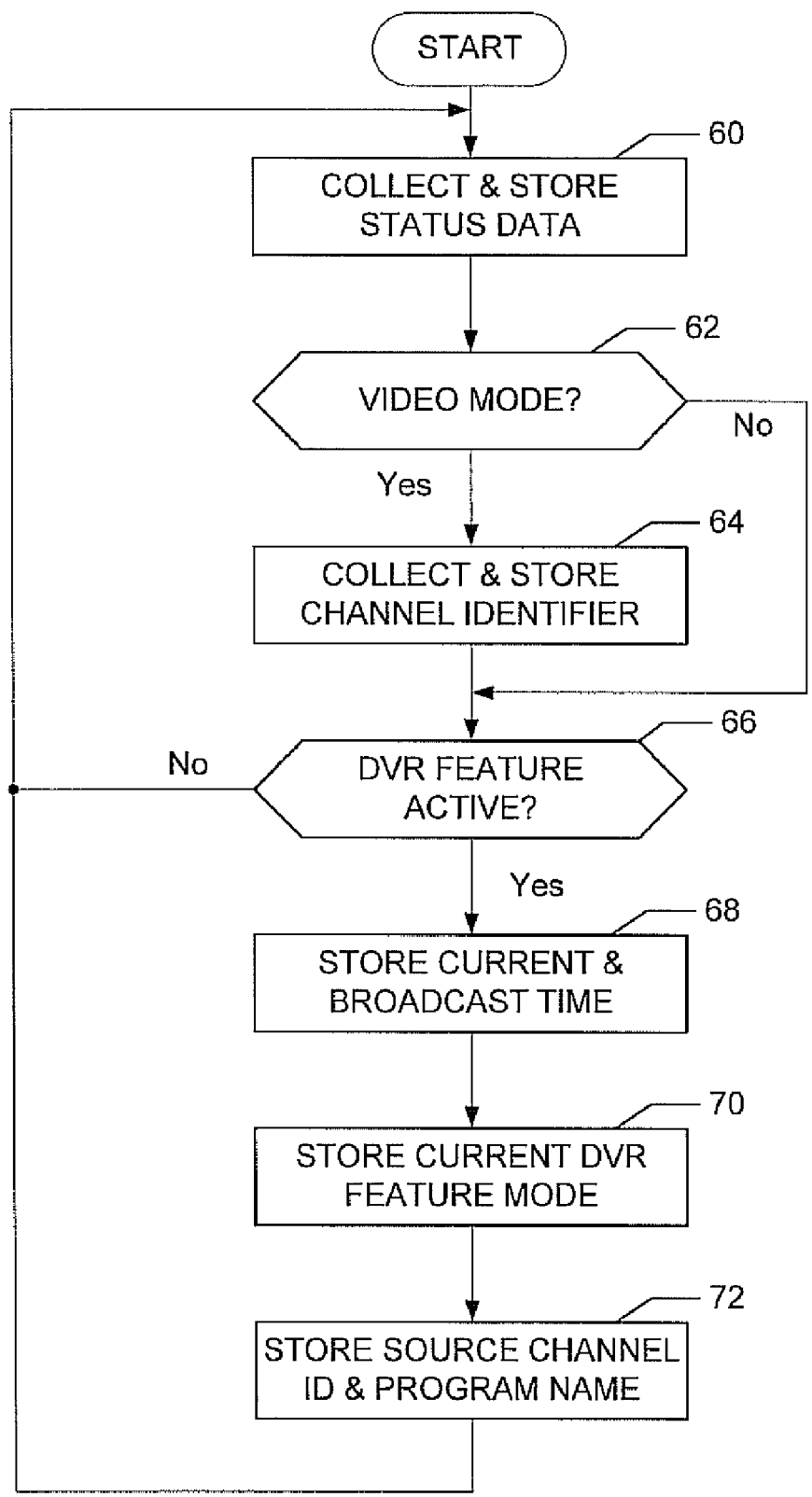
FIG. 4 is a flowchart representative of example machine readable instructions which may be executed by the processor of FIG. 2 to implement the data collector of FIG. 3.
Figure 5:
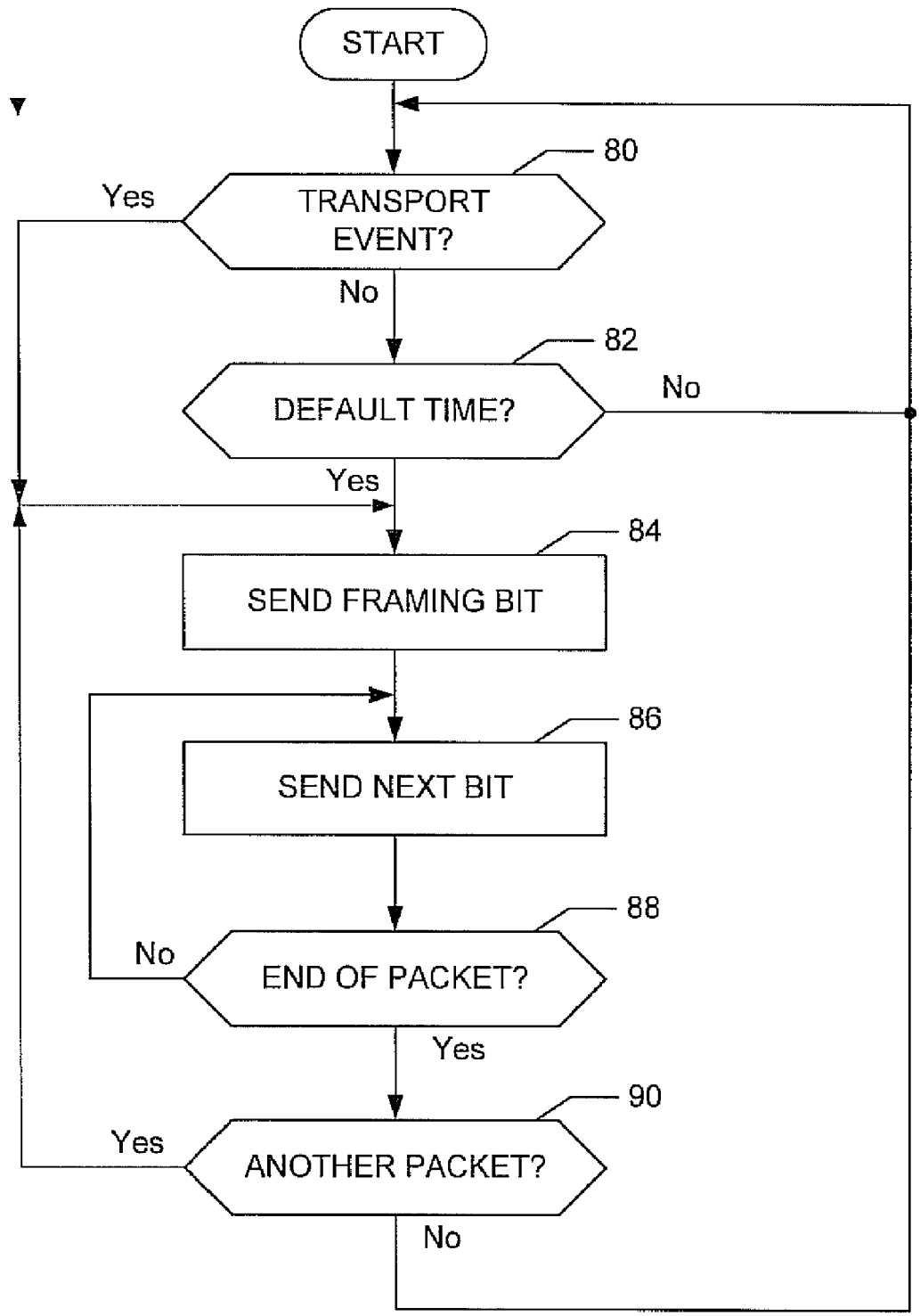
FIG. 5 is a flowchart representative of example machine readable instructions which may be executed by the processor of FIG. 2 to implement the LED modulator of FIG. 3.

Flowcharts representative of example machine readable instructions for implementing the apparatus 50 of FIG. 3 is shown in FIGS. 4-5. In this example, the machine readable instructions comprise a program for execution by a processor such as the processor 42 shown in the example discussed above in connection with FIG. 2. The program may be embodied in software stored on a tangible medium such as a CD-ROM, a floppy disk, a hard drive, a digital versatile disk (DVD), or a memory 44 associated with the processor 42, but persons of ordinary skill in the art will readily appreciate that the entire program and/or parts thereof could alternatively be executed by a device other than the processor 42 and/or embodied in firmware or dedicated hardware in a well known manner. For example, any or all of the data collector 52 and/or the LED modulator 54 could be implemented by software, hardware, and/or firmware. Further, although the example program is described with reference to the flowcharts illustrated in FIGS. 4-5, persons of ordinary skill in the art will readily appreciate that many other methods of implementing the example apparatus 50 may alternatively be used. For example, the order of execution of the blocks may be changed, and/or some of the blocks described may be changed, eliminated, divided, or combined.

Although the program of FIGS. 4 and 5 are shown as two separate routines, persons of ordinary skill in the art will appreciate that they can be integrated into one program or maintained in separate programs. For example, they may be executed as two separate threads executing on the same or different processors.

The program of FIG. 4 begins at block 60 where the data collector 52 collects and stores status data in the memory. In the illustrated example, status data includes information identifying the operating mode of the receiving device 36 being monitored. For example, the receiving device might be in a standby mode, a power off mode, a power on mode, a bypass mode, an RF input mode, a DVR mode, a VOD mode, etc.

After the status data is collected and stored (block 60), the data collector 52 determines if the receiving device is in a video mode (e.g., the receiving device is outputting a tuned video signal (which may be a VOD signal) in real time) (block 62). If the receiving device 36 is not in the video mode (block 62), control advances to block 66. Otherwise, if the receiving device 36 is in a video mode (block 62), the data collector 52 collects and stores the identifier of the tuned channel and/or a program name identifier and/or any available VOD information (block 64). The channel identifier may include the channel number and/or the call letters of the tuned channel.

After the channel identifier and/or the program name is stored (block 64), or if the receiving device 36 is not in the video mode (block 62), the data collector 52 determines if any digital video recording feature (e.g., play, pause, fast forward, record, etc.) of the receiving device 36 is active (block 66). If not, control returns to block 60. If, however, a digital video recording feature (which may, of course, be invoked in the VOD context) is active, the data collector 52 stores the current time (i.e., the time at which the digital video recording feature is active) and the broadcast time (i.e., the time at which the video signal being processed via the digital recording feature was broadcast)(block 66). Of course, if the receiving device 36 is recording a broadcast signal, then the current time and the broadcast time may be identical or substantially identical.

After recording the current time and the broadcast time (block 68), the data collector 52 stores the current DVR feature mode (e.g., playback, recording, pause, fast forward, rewind, etc.)(block 70). The data collector 52 also stores the channel identifier (e.g., the channel number and/or call letters) of the original source of the program being processed as well as the name of the program (if available) and any available VOD information (block 72). Control then returns to block 60.

The program of FIG. 5 begins at block 80 where the LED modulator 54 determines if an event triggering data exportation (e.g., storage of more than a predetermined amount of data in the memory, etc.) has occurred. If such an even has occurred (block 80), control advances to block 84. If a triggering event has not occurred (block 80), the LED modulator 54 determines if a default timer has expired (e.g., a predetermined period of time has passed since the last data exportation occurred) (block 82). If the default time has not expired (block 82), control returns to block 80. Otherwise, control advance to block 84.

Figure 6:
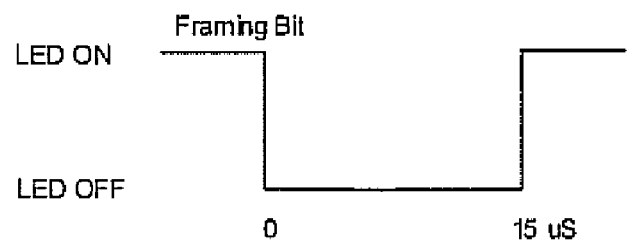
FIG. 6 is a diagram representative of an example framing bit.

Irrespective of whether control reaches block 84 via block 82 or directly from block 80, at block 84 the LED modulator 54 initiates the transmission of the first packet in a data queue by modulating the LED 46 in a predetermined pattern representative of a framing bit. The framing bit is provided for synchronization, namely, to identify the start of a packet of data. An example framing bit pattern is shown in FIG. 6. In that example, the framing bit is represented by holding the LED 46 in an off state for 15 microseconds.

Figure 7:
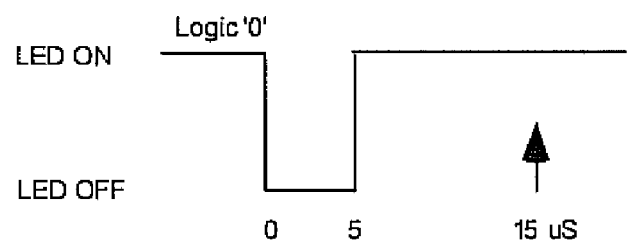
FIG. 7 is a diagram representative of an example logic 0 bit.
Figure 8:
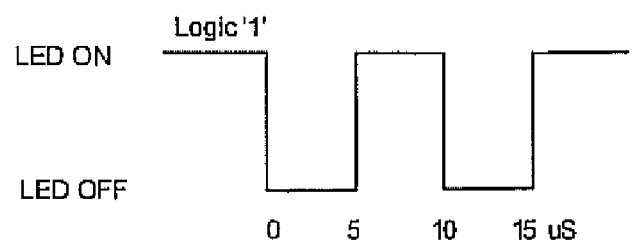
FIG. 8 is a diagram representative of an example logic 1 bit.

After the framing bit has been transmitted (block 84), the LED modulator 54 begins modulating the LED to transmit the data bits of the packet (block 86). In particular, the LED modulator 54 modulates the LED 46 between an on-state and an off-state in accordance with a predefined pattern representing the data bit to be transmitted. The data bits are represented by logic 0's and logic 1's. An example LED modulation pattern for transmitting a logic 0 bit is shown in FIG. 7. An example LED modulation pattern for transmitting a logic 1 bit is shown in FIG. 8. The LED modulator 54 modulates the LED 46 in accordance with these patterns to transmit the data bits in the packet. In the illustrated examples, each bit takes 15 microseconds to transmit. Because of the short duration of the on and off periods to transmit the data bits and the framing bit, the human eye will not detect the flickering of the LED 46.

Persons of ordinary skill in the art will appreciate that various data formats may be used for transmitting the tuning data. In the illustrated example, each character is represented by a combination of logic 1's and/or 0's arranged to form an 8 bit binary coded character. No stop bit, no start bit, and no parity bit is used. In the illustrated example, each data packet includes: (1) a framing bit, (2) a prefix identifying a type of data contained in the payload of the packet (e.g., real time viewing data such as channel and/or status/menu information, or digital video recorder feature data), and (3) the payload data (in 8 bit binary coded characters as explained above).

Returning to FIG. 5, after the LED modulator 54 modulates the LED 46 to transmit a data bit (block 86), the LED modulator 54 determines if there are any bits in the current data packet that have not yet been transmitted (block 88). If the end of the packet has not been reached (i.e., there is one or more bits remaining to transmit) (block 88), control returns to block 86 where the next bit is transmitted. When the last bit in the packet has been transmitted (block 88), control advances to block 90.

At block 90, the LED modulator 54 determines if there is another packet of data in the queue. If not, control returns to block 80. If, however, there is another packet to transmit (block 90), control returns to block 84.

Figure 9:
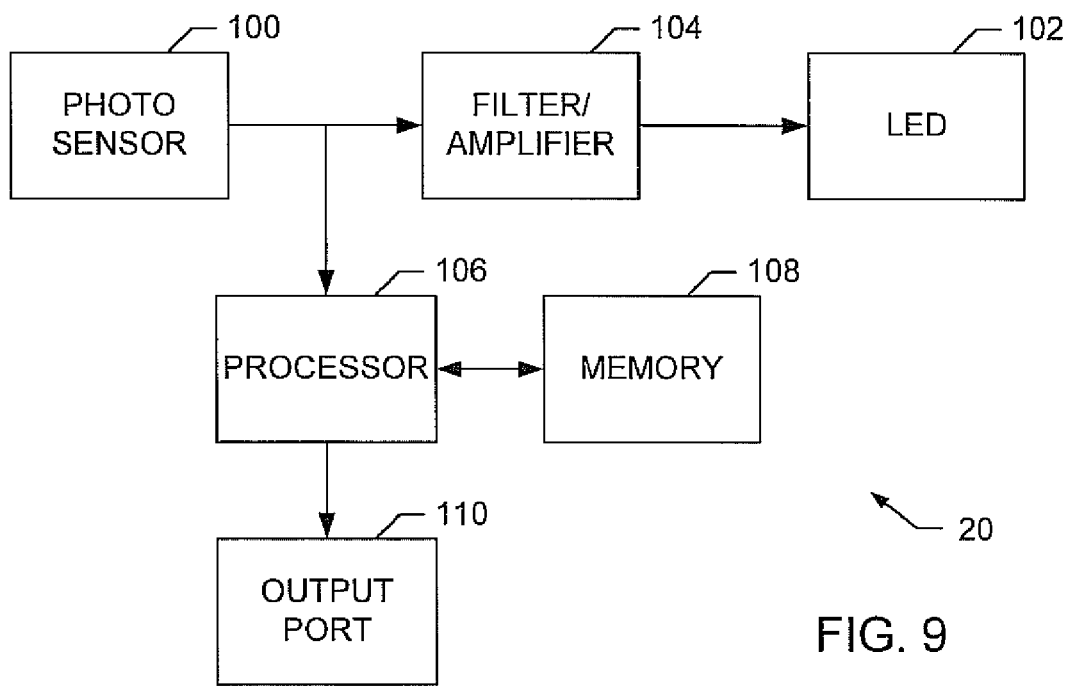
FIG. 9 is a more detailed schematic illustration of the example sensing module of FIG. 2.

As mentioned above, the audience measurement system 10 includes a sensing module 20 to monitor the output of the modulated LED 46 to extract the tuning data collected within the receiving device. An example sensing module is shown in FIG. 9. Because the light emitted by the LED 46 tends to not carry very far, it is easiest to sense the data transmitted by the modulated LED 46 by placing the sensing module immediately adjacent the LED 46 as shown in FIG. 2.

In the example of FIG. 9, the sensing module 20 includes a photo sensor 100 to monitor the LED 46. In the illustrated example, the photo sensor 100 of the sensing module 20 is placed immediately adjacent the LED 46. Positioning the photo sensor 100/sensing module 20 in this fashion occludes the LED 46 to the audience members. Because the audience members may wish to see the LED 46 for its intended purpose (e.g., power indication), the sensing module 20 of the illustrated example includes a second LED 102 which is visible to the audience members and which outputs at least the low frequency portion of the signal output by the LED 46 of the receiving device. The second LED is not modulated to output the tuning data. Thus, the second LED 102 outputs the information that would normally be conveyed by the LED 46 (e.g., power indication information) in the absence of the sensing module 20 and software meter, but does not output the tuning data.

To drive the second LED 102, the example sensing module 20 of FIG. 9 is provided with a filter/amplifier 104. The filter/amplifier 104 processes the signal output by the photo sensor 100 into a signal suitable for driving the LED 102. For example, the filter/amplifier 104 may be implemented as a low pass filter that strips off the high frequency data (i.e., the tuning data) detected by the photo sensor 102 and amplifies the filtered signal to a level sufficient to drive the LED 102 to the output state selected by the receiving device 36 (i.e., the output state absent the overlaid tuning data modulations).

As shown in FIG. 9, in addition to being coupled to the filter/amplifier 104, the output of the photo sensor 100 is also delivered to a processor 106 which converts the output of the photo sensor 100 back into the digital tuning data used by the LED modulator 54 to drive the LED 46. In the illustrated example, the processor 100 accomplishes this conversion by monitoring the pulse widths of the off-times of the LED 46 as represented by the output of the photo sensor 100 and comparing those pulse widths to predetermined patterns or codes representative of a framing bit, a logic 1 bit and/or a logic 0 bit. When a match is identified, the processor records the corresponding framing bit, 1 or 0. In this way, the tuning data collected and stored in the receiving device 36 may be reconstructed and stored in the sensing module 20.

As with the processor 42, the processor 106 may be implemented by any commercially available processor such as a microprocessor sold by Intel, AMD, Texas Instruments, etc.

As is conventional, the processor 106 is coupled to one or more memories 108. The memory 108 may be any type of volatile or non-volatile memory or a combination thereof. For example, the memory 108 may include one or more of: dynamic random access memory, static random access memory, flash memory, a hard drive, etc. Preferably, a portion of the memory 108 stores machine readable instructions which may be executed by the processor 106 to perform various functions such as converting the output of the photo sensor 100 into the digital tuning data. The tuning data converted by the processor 106 is also preferably stored in the memory 108. The memory 108 may also buffer the data output by the photo sensor 100 before it is converted by the processor 106.

To enable exporting of the tuning data to, for example, the home unit 22, the sensing module 20 is further provided with an output port 110. The output port 110 can be implemented in any conventional fashion. For example, it may comprise a RS-232 port or a universal serial bus port.

Figure 10:
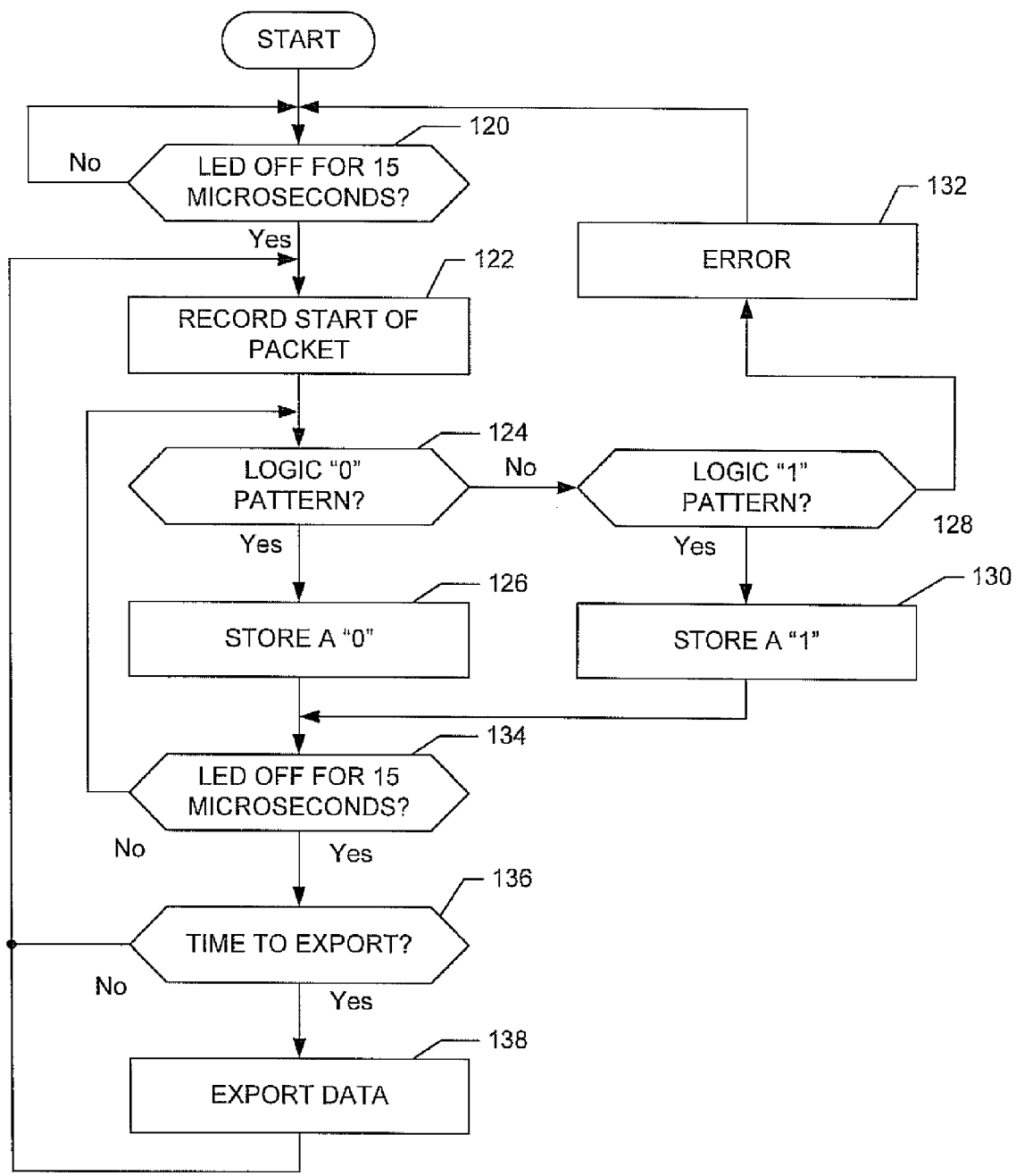
FIG. 10 is a flowchart representative of example machine readable instructions which may be executed by the processor of FIG. 9 to extract the tuning data from the signal sensed by the photo sensor of FIG. 9.

A flowchart representative of example machine readable instructions for extracting the tuning data from the output of the photo sensor 100 is shown in FIG. 10. In this example, the machine readable instructions comprise a program for execution by a processor such as the processor 106 of the example discussed above in connection with FIG. 9. The program may be embodied in software stored on a tangible medium such as a CD-ROM, a floppy disk, a hard drive, a digital versatile disk (DVD), or the memory 108 associated with the processor 106, but persons of ordinary skill in the art will readily appreciate that the entire program and/or parts thereof could alternatively be executed by a device other than the processor 106 and/or embodied in firmware or dedicated hardware in a well known manner. Further, although the example program is described with reference to the flowchart illustrated in FIG. 10, persons of ordinary skill in the art will readily appreciate that many other methods of extracting the tuning data from the output of the photo sensor 100 may alternatively be used. For example, the order of execution of the blocks may be changed, and/or some of the blocks described may be changed, eliminated, divided, or combined.

The program of FIG. 10 begins at block 120 where the sensing module 20 attempts to synchronize with the data output by the LED 46. In particular, the program attempts to detect a 15 microsecond period wherein the LED 46 is held in an off state (block 120). When such a period is detected, the start of a packet is recorded (block 122). The program then enters into a loop wherein it attempts to compare the on-off sequence of the signal output by the photo sensor 100 to patterns representative of logic 1's and logic 0's (see for example, FIGS. 7-8).

In the example of FIG. 10, the program compares the output of the photo sensor 100 to a pattern representative of a logic "0" (block 124). If the output signal matches the logic 0 pattern (block 124), a logic 0 bit is recorded (block 126). If the output signal does not match the logic 0 pattern (block 124), the program compares the output of the photo sensor 100 to a pattern representative of a logic "1" (block 128). If the output signal matches the logic 1 pattern (block 128), a logic 1 bit is recorded (block 130). If the output signal does not match the logic 1 pattern (block 128), an error message is recorded (block 132), and control returns to block 120 to await the start of the next packet.

Assuming that a logic 0 bit or a logic 1 bit is identified and recorded (block 126 or block 130), control advances to block 134. At block 134, the program determines whether a framing bit has been received. This determination can be made in the negative using the bit patterns illustrated in FIGS. 6-8 if the LED 46 is driven to the on-state in less than 15 microseconds. If a framing bit has not been received, control returns to block 124 where the program attempts to identify the data bit as a logic 1 or a logic 0 bit. If, however, the LED 46 is held in the off state for 15 microseconds (i.e., a framing bit has been received) (block 134), control advances to block 136.

At block 136, the program determines if data should be exported from the sensing module 20 to the home unit 22. This determination may be made, for example, based on the quantity of data stored in the memory 108, the length of time since the last data export, etc. If it is time to export data (block 136), the data is exported to, for example, the home unit 22 via the output port 110 (block 138). Control then returns to block 122. If it is not time to export data (block 136), control returns to block 122 without exporting data to the home unit 22.

As mentioned above, it may be desirable to use a portable metering device 22, 24 in some applications. In such circumstances, it may be desirable to have a wireless connection between the sensing module 20 and the metering device 22, 24. An alternative example sensing module that enables such a wireless connection is shown in FIG. 11.

Figure 11:
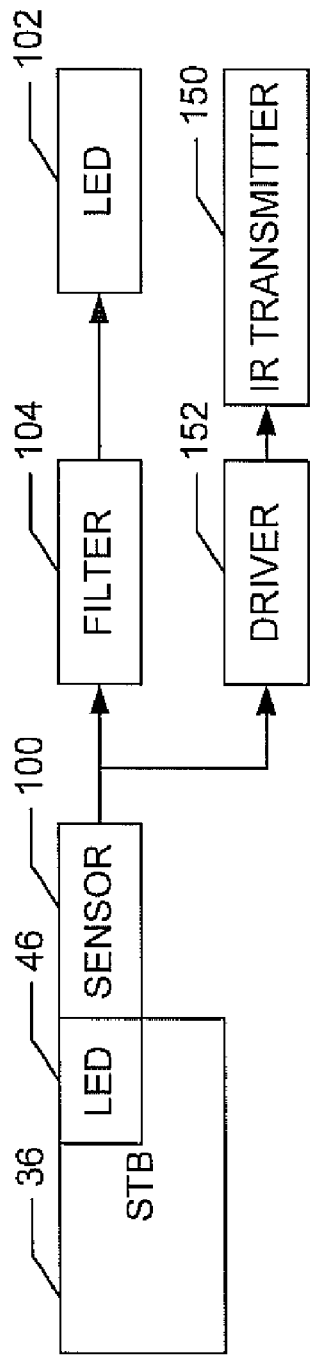
FIG. 11 is a schematic illustration of another example receiving device and an alternative example sensing module which may be employed in the system of FIG. 1.

Like the sensing module 20 of FIG. 9, the sensing module of FIG. 11 includes a photo sensor 100, a filter/amplifier 104 and a second LED 102. The structure and operation of these components may be identical in the sensing module of FIG. 11 and the sensing module 20 or FIG. 9. Therefore, a description of those components is not repeated here. Instead, the interested reader is referred to the above description of the example of FIG. 9 for a full explanation of those components.

Unlike the sensing module 20 of FIG. 9, the sensing module of FIG. 11 is provided with an infrared transmitter 150. The infrared transmitter 150 is coupled to the output of the photo sensor 100 via a driver 152. The driver 152 receives the output of the sensor 100 and filters and converts it into a signal appropriate for driving the IR transmitter 150. The IR transmitter 150 thus repeats the signal output by the sensor 100 in the infrared region to transmit it a further distance from the receiving device 36 than could be reliably transmitted by the LED alone. Therefore, the driver 152 and the IR transmitter 150 function as an infrared converter of the output of the photo sensor 100.

Although not shown in the example of FIG. 11, the sensing module of FIG. 11 could be provided with a processor 106 and memory 108, and the IR converter 150/152 could function as the output port 110 to transmit the tuning data as interpreted by the processor to the home unit 22. However, in the preferred implementation, the sensing module of FIG. 11 does not include a processor 106 to extract the tuning data from the output of the photo sensor. Instead, it simply exports the un-interpreted output of the photo sensor to an external device.

Figure 12:
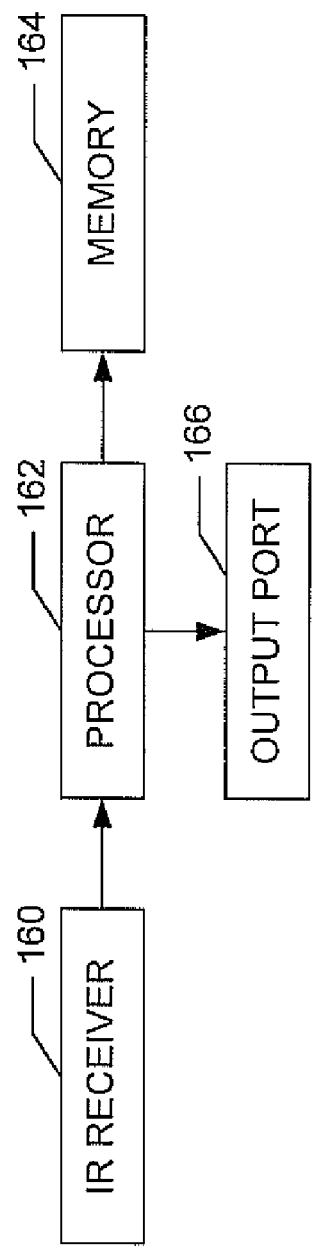
FIG. 12 is a schematic illustration of an example portable monitoring device which may be employed to receive the tuning data output by the example sensing module of FIG. 11.

An example external device for receiving and interpreting the tuning data transmitted by the IR transmitter 150 is shown in FIG. 12. In the example of FIG. 12, the external device includes an IR receiver 160, a processor 162, a memory 164 and an output port 166. The IR receiver 160 detects the IR signals transmitted by the IR transmitter 150 and converts them into electrical signals corresponding to the signals output by the photo sensor 100. The processor 162 operates similarly or identically to the processor 106 described above to convert the output signals of the IR receiver 160 into framing bits, logic 1 bits and logic 0 bits, and to store the converted data in the memory 164. As with the sensing module 20 of FIG. 9, the device of FIG. 12 is provided with an output port 166 which may be used to transmit the tuning data to the home unit 22.

The external device of FIG. 12 may be a portable people meter 24. In such an example, the portable people meter 24 may be adapted to be placed in a docking station to output the collected audience demographics data and the tuning data received via the IR receiver 160 to the home unit 22 or, if no home unit 22 is employed, to the central office 18.

From the foregoing, persons of ordinary skill in the art will appreciate that the methods and apparatus to export tuning data from a receiving device have been disclosed. Although in the presently preferred implementations, the apparatus 50 outputs data by modulating a single LED between an on-state and an off-state, persons of ordinary skill in the art will appreciate that the data transmission rate (e.g., the bandwidth) can be increased by modulating more than one LED (where available) in parallel to represent two or more bits of data simultaneously. For example, two LEDs can be modulated to operate as explained above, but in parallel to effectively double the data transmission rate. Alternatively, an LED display panel may be modulated to display predefined, recognizable codes representative of the tuning data, or to display patterns representative of digital data (e.g., ones and zeros) that is representative of the tuning data at rates noticeable or not noticeable to the human eye.

Further, although the above examples employ a photo sensor 100 to extract data from the modulated LED signal, persons of ordinary skill in the art will appreciate that the photo sensor 100 may be eliminated if electrical connectors or leads are coupled to the leads of the LED 46 to directly obtain the electrical modulated signal driving the LED 46. In such circumstances, the LED 46 may not be occluded by the sensing module 20, so it may also be possible to eliminate the filter/amplifier 104 and the second LED 102.

Persons of ordinary skill in the art will further appreciate that the above disclosed methods and apparatus may be used to retrofit existing receiving devices 36 such as set top boxes that were not originally intended to perform audience measurement functionality to collect tuning data. This may be accomplished by, for example, downloading a software meter (e.g., the apparatus 50) to the receiving device 36 and executing it to collect desired tuning data. Since the receiving device 36 was not designed with the intent of collecting tuning data, it may not have an available output port to export the collected tuning data. The above methods and apparatus overcome such a difficulty by effectively turning an LED 46 associated with the receiving device 36 and intended for another purpose into a data port for exporting tuning data.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of collecting audience measurement data comprising:
    collecting tuning data within a receiving device;
    modulating an LED associated with the receiving device between an on-state and an off-state, at a rate above the sensitivity of the human eye, in a sequence representing the collected tuning data to export the collected tuning data from the receiving device, wherein the LED is included in an LED display provided in the receiving device to display a number of a channel currently tuned by the receiving device and wherein the LED is modulated to export the collected tuning data at a time when the LED display is also displaying the channel number.

2. A method as defined in claim 1 wherein the LED is provided in the receiving device for a purpose other than electronic data transmission.

3. A method as defined in claim 1 wherein modulating the LED comprises modulating one segment of the LED display.

4. A method as defined in claim 1 wherein modulating the LED comprises modulating the segments of the LED display to display codes representative of the collected tuning data.

5. A method as defined in claim 1 wherein the receiving device comprises a set top box.

6. A method as defined in claim 1 further comprising monitoring the output of the modulated LED to extract the collected tuning data from the receiving device.

7. A method as defined in claim 6 wherein the output of the modulated LED is monitored with a photosensor.

8. A method as defined in claim 7 wherein at least a low frequency component of the output of the photosensor is input to a second LED.

9. A method as defined in claim 7 wherein at least a low frequency component of the output of the photosensor is converted into an infrared output signal.

10. A method as defined in claim 9 wherein the infrared output signal is received and stored in a portable monitoring device.

11. A method as defined in claim 1 wherein the tuning data comprises at least one of: (a) a channel identifier, (b) status data, (c) a local source identifier, (d) a menu indicator, (e) a program guide indicator, (f) power status, (g) an input signal condition indicator, (h) a program identification code, (i) a station identification code, (j) a watermark, (k) a program signature, (l) video-on-demand state identifier, (m) VOD ordering information, (n) VOD payment information, (o) VOD program identification, (p) time of VOD order information, (q) time of VOD delivery information, (r) a DVR state identifier, (s) a playback time, (t) a broadcast time, (u) a playback mode, (v) a source channel identifier, and (w) a program name.

12. A method as defined in claim 1 wherein modulating the LED comprises modulating the LED to indicate a start of a data packet with a predetermined framing bit signal.

13. A method as defined in claim 1 wherein modulating the LED comprises modulating the LED to transmit a first prefix for a first type of data and a second prefix for a second type of data.

14. A method as defined in claim 13 wherein the first type of data comprises real time viewing information and the second type of data comprises recorded viewing information.

15. A method as defined in claim 1 further comprising obtaining a drive signal to the LED via an electrical connection to extract the collected tuning data from the receiving device.

16. A method as defined in claim 1, wherein the tuning data represents tuning to at least two different channels, the tuning data representing the at least two different channels being stored for a time period and exported while the receiving device is tuned to a third channel while the channel number of the third channel is displayed.

17. A receiving device comprising:
   a tuner to tune a broadcast channel;
   an LED display to display at least a portion of a symbol representative of the broadcast channel tuned by the tuner, the LED display including two or more LED segments;
   a processor; and
   a memory storing instructions which when executed by the processor, cause the processor to:
      collect tuning data within the receiving device; and
      modulate at least one of the LED segments between an on-state and an off-state, at a rate above the sensitivity of the human eye, in a sequence representing the collected tuning data to export the collected tuning data from the receiving device, wherein the at least one of the LED segments is modulated to export the collected tuning data concurrently with the display by the LED display of the at least the portion of the symbol representative of the broadcast channel tuned by the tuner.

18. A receiving device as defined in claim 17 wherein the LED is provided in the receiving device for a purpose other than electronic data transmission.

19. For use with a receiving device having a tuner and a memory to collect tuning data reflecting usage of the receiving device, an article of manufacture storing machine readable instructions which, when executed, cause the receiving device to:
   collect tuning data within the receiving device; and
   modulate an LED between an on-state and an off-state, at a rate above the sensitivity of the human eye, in a sequence representing the collected tuning data to export the collected tuning data from the receiving device, wherein the LED is a segment in an LED display provided in the receiving device to display a number of a channel tuned by the receiving device and is modulated between the on-state and the off-state to export the collected tuning data while the LED display is displaying the channel number in humanly visible form.

20. A receiving device as defined in claim 19 wherein the LED is provided in the receiving device for a purpose other than electronic data transmission.

21. A method of collecting audience measurement data comprising:
   collecting tuning data within a receiving device;
   modulating an LED associated with the receiving device to export the collected tuning data from the receiving device; and
   monitoring the output of the modulated LED to extract the collected tuning data from the receiving device,
   wherein the output of the modulated LED is monitored with a photosensor, and wherein at least a low frequency component of the output of the photosensor is input to a second LED.

22. A method of collecting audience measurement data comprising:
   collecting tuning data within a receiving device;
   modulating an LED associated with the receiving device to export the collected tuning data from the receiving device; and
   monitoring the output of the modulated LED to extract the collected tuning data from the receiving device,
   wherein the output of the modulated LED is monitored with a photosensor, and wherein at least a low frequency component of the output of the photosensor is converted into an infrared output signal.

23. A method as defined in claim 22 wherein the infrared output signal is received and stored in a portable monitoring device.

24. A method of collecting audience measurement data comprising:
   collecting tuning data within a receiving device;
   modulating an LED associated with the receiving device to export the collected tuning data from the receiving device; and
   monitoring the output of the modulated LED to extract the collected tuning data from the receiving device,
   wherein modulating the LED comprises modulating the LED to indicate a start of a data packet with a predetermined framing bit signal.

* * * * *